US008162754B2

(12) United States Patent
Asami

(10) Patent No.: US 8,162,754 B2
(45) Date of Patent: Apr. 24, 2012

(54) GAME DEVICE, NOTIFICATION METHOD, NON-TRANSITORY INFORMATION RECORDING MEDIUM AND PROGRAM FOR INFORMING DISPLACEMENT OF GAME CONTROLLER MAT

(75) Inventor: Yuichi Asami, Tokyo (JP)

(73) Assignee: Konami Digital Entertainment Co., Ltd, Tokyo (JP)

( * ) Notice: Subject to any disclaimer, the term of this patent is extended or adjusted under 35 U.S.C. 154(b) by 503 days.

(21) Appl. No.: 12/438,821

(22) PCT Filed: Aug. 22, 2007

(86) PCT No.: PCT/JP2007/066296
§ 371 (c)(1),
(2), (4) Date: Feb. 25, 2009

(87) PCT Pub. No.: WO2008/023740
PCT Pub. Date: Feb. 28, 2008

(65) Prior Publication Data
US 2009/0258704 A1    Oct. 15, 2009

(30) Foreign Application Priority Data

Aug. 25, 2006 (JP) ................................. 2006-228691

(51) Int. Cl.
*A63F 13/02* (2006.01)
(52) U.S. Cl. .............................. 463/36; 463/43; 345/156
(58) Field of Classification Search .................. None
See application file for complete search history.

(56) References Cited

U.S. PATENT DOCUMENTS

| 5,837,952 | A | 11/1998 | Oshiroi |
| 7,331,856 | B1 * | 2/2008 | Nakamura et al. ................ 463/7 |
| 2001/0034014 | A1 * | 10/2001 | Nishimoto et al. ........... 434/247 |
| 2002/0019258 | A1 * | 2/2002 | Kim et al. ....................... 463/36 |

(Continued)

FOREIGN PATENT DOCUMENTS

JP    11-253656    9/1999

(Continued)

OTHER PUBLICATIONS

International Search Report PCT/JP2007/066296 dated Aug. 22, 2007.

(Continued)

*Primary Examiner* — Fernando L Toledo
*Assistant Examiner* — Peter Bradford
(74) *Attorney, Agent, or Firm* — Howard & Howard Attorneys PLLC

(57) ABSTRACT

A process control unit (306) controls a music reproduction unit (309) to output a music sound, while controlling a request content creation unit (305) to present content of a motion requested to the player. At the same time, the process control unit (306) compares content of the motion acquired from a motion content acquiring unit (302) with the presented, requested motion (and the timing) to evaluate the stepping motion of the player. Further, during the game, the process control unit (306) sequentially measures the amount of displacement of the game mat in accordance with the position, etc. of the controller, the position being detected by a controller detection unit (303). Then, when the measured amount of displacement exceeds a reference value, an alarm message is synthesized to a game screen and displayed, and the game mat displacement is informed to call attention of the player.

9 Claims, 9 Drawing Sheets

U.S. PATENT DOCUMENTS

| | | | |
|---|---|---|---|
| 2004/0127285 A1* | 7/2004 | Kavana | 463/36 |
| 2007/0003915 A1* | 1/2007 | Templeman | 434/247 |
| 2007/0052177 A1* | 3/2007 | Ikeda et al. | 273/317 |
| 2007/0060383 A1* | 3/2007 | Dohta | 463/43 |
| 2007/0181684 A1* | 8/2007 | Takano et al. | 235/454 |
| 2007/0265075 A1* | 11/2007 | Zalewski | 463/36 |
| 2008/0039199 A1* | 2/2008 | Baer et al. | 463/36 |
| 2008/0139307 A1* | 6/2008 | Ueshima et al. | 463/31 |

FOREIGN PATENT DOCUMENTS

| | | |
|---|---|---|
| JP | 2000-207990 | 7/2000 |
| JP | 2000-293294 | 10/2000 |
| JP | 2001-029658 A | 2/2001 |
| JP | 2003-024621 A | 1/2003 |
| JP | 2003-093741 | 4/2003 |
| JP | 2005-021563 | 1/2005 |
| KR | 2001-0093735 A | 10/2001 |
| TW | 485053 | 5/2002 |
| TW | I230088 | 4/2005 |
| WO | WO 97/32641 | 9/1997 |

OTHER PUBLICATIONS

Supplementary Search Report of Oct. 28, 2009 for European Patent Application No. EP07792882, 6 pages.

Office Action with English Translation for Taiwanese Patent Application No. 096131427 mailed on Jun. 23, 2010, 11 pages.

Korean Office Action dated Feb. 16, 2011 with English Translation.

* cited by examiner

GAME DEVICE, NOTIFICATION METHOD, NON-TRANSITORY INFORMATION RECORDING MEDIUM AND PROGRAM FOR INFORMING DISPLACEMENT OF GAME CONTROLLER MAT

TECHNICAL FIELD

The present invention relates to a game device, a method for alarming, an information recording medium and a program that are suitable for calling attention to displacement of a mat, in a game wherein the player performs a stepping motion on the mat.

BACKGROUND ART

Dance game devices on which a player performs a stepping motion (step motion) to a tune have conventionally enjoyed popularity in game halls or the like. One such dance game device is configured, for example, to have a dedicated stage provided in front of a monitor: a player stands on the stage, and steps on a plurality of areas identified by predetermined marks or colors. In an actual game, a player steps to a tune (fixing timing) on correct regions in accordance with instructions of requested motion (designation of regions on which to step, etc.) displayed on the monitor, to compete for a high score.

In recent years, game mats (so-called dance controller) designed for household game devices are commercially available so that the above-described dance game can be enjoyed in house. Such a game mat can be connected to an external terminal or the like of a game device, detect steps of a player on the mat by means of switches, etc., and input the stepping motion to the game device.

One example of such a game mat (foot switch device) has been disclosed: in the technique, the mat makes it possible to recognize a position of a foot switch provided on the mat, by a tactile sensation of a foot (see, i.e. Patent Literature 1).

Patent Literature 1: Unexamined Japanese Patent Application KOKAI Publication No. 2000-293294 (pages 3-11 and FIG. 1)

DISCLOSURE OF THE INVENTION

Problems to be Solved by the Invention

In an actual game play using the above-described game mat, the mat might be displaced (moved) from an original position by the nature of the floor (tatami mats, carpets or flooring, etc.) or the strength of stepping (magnitude of move of body weight).

In general, a player watches the game screen (without watching the player's step) on performing a stepping motion on the mat. Therefore, if the displacement of the mat itself is caused, the regions that should have been stepped are not stepped, and the regions that should have been avoided are stepped. That is, the stepping motion intended by the player should becomes different from the actual stepping motion to be input to the game device.

In this case, the player cannot obtain a high score and therefore the player suspects switch failure (contact failure, etc.) in the mat and tends to make a stronger step, which invites further displacement of the mat, involved in a vicious circle.

Where the strongness of step is larger than is necessary, there is another concern about a large vibration or a noise that could be given to the downstairs or the like.

Therefore there has been a demand for in-game informing to the player to alarm a condition that could cause the displacement of the mat.

It has also been demanded that a higher evaluation be made to a stepping motion that does not cause the mat displacement so that the player is prevented from making a step stronger than is necessary.

The present invention is made to solve such a problem, and an object of the present invention is to provide a game device, a method for alarming, an information recording medium and a program that can call attention to the displacement of a mat, in a game wherein the player performs a stepping motion on the mat.

Another object of the present invention is to provide a game device or the like that can highly evaluate such a stepping motion as not to cause mat displacement.

Means for Solving the Problems

A game device according to a first aspect of the present invention is a game device that includes a detection mat that detects a pressure over a predetermined range and a controller detachably attached to the detection mat, the game device being configured to acquire, via the controller, an operation instruction made by a stepping motion of a player on the detection mat, and configured to include a controller detection unit, a measuring unit and an output control unit.

First, the controller detection unit detects a position of the controller attached to the detection mat at every predetermined timing. Further, the measuring unit measures an amount of displacement (for example, the amount of change of the position from a reference position) during a game, based on a relationship among the detected positions. Then, the output control unit outputs advisory information in a case where the measured amount of displacement exceeds a reference value: for example, the output control unit synthesizes an alarm message or the like to a game screen and displays it, or emits an alarm sound, etc.

That is, the amount of displacement (amount of change of position) of the detection mat is measured based on a relationship of the controller attached to the detection mat, and the displacement of the detection mat can be informed to the player by outputting advisory information in a case where the amount of displacement exceeds a reference value.

As a result, attention can be called to the displacement of the mat.

The measuring unit may measure the amount of displacement of the detection mat during a game, based on a relationship between the position of the controller at a game start and the position of the controller at a termination of the game.

The measuring unit may measure, for example, the summation of the amount of displacement from the game start to the game termination. Further, the measuring unit may total the length of time over which the amount of displacement exceeds a reference value. That is, it is possible not only that the amount of displacement is measured based on the position at the game start and the position at the game termination, but also that the amount of displacement of the detection mat during the game may measured in view of the history (progress) of the change of the displacement of the detection mat, etc.

The measuring unit may measure the strength of the stepping of the player based on the change in an orientation of a frontal of the controller during the game.

A game device according to a second aspect of the present invention includes a detection mat that detects a pressure over a predetermined range and a controller detachably attached to the detection mat, the game device being configured to acquire, via the controller, an operation instruction made by a stepping motion of a player on the detection mat, and is configured to include a controller detection unit, a measuring unit and a game control unit.

First, the controller detection unit detects a position of the controller attached to the detection mat at every predetermined timing. Further, the measuring unit measures the amount of displacement of the detection mat during the game, based on a relationship among the detected positions. Then, the game control unit suspends the progress of the game in a case where the measured amount of displacement exceeds a reference value.

That is, the amount of displacement of the detection mat can be measured based on a relationship of the controller attached to the detection mat, and the displacement of the detection mat can be informed to a player by suspending the progress of the game in a case where the amount of displacement exceeds a reference value.

As a result of this, attention can be called to the displacement of the mat.

The above game device may further include an output control unit that outputs predetermined advisory information in a case where the game control unit suspends the progress of the game. The game control unit may resume the progress of the game after elapse of a predetermined time from the suspension. Further, the game progress may be resumed after acquisition of a predetermined operation instruction.

A game device according to a third aspect of the present invention includes a detection mat that detects a pressure over a predetermined range and a controller detachably attached to the detection mat, the game device being configured to acquire, via the controller, an operation instruction made by a stepping motion of the player on the detection mat, and configured to include a reproduction unit, a controller detection unit, a measuring unit and a reproduction control unit.

First, the reproduction unit reproduces an accompaniment for a stepping motion performed by a player. Further, the controller detection unit detects a position of the controller attached to the detection mat at every predetermined timing.

On the other hand, the measuring unit measures the amount of displacement of the detection mat during the game based on a relationship among the detected positions. Then, the reproduction control unit sets a tempo of the accompaniment slower than standard, based on the measured amount of displacement.

That is, the displacement of the detection mat can be informed to the player by measuring the amount of displacement of the detection mat based on a relationship of the controller attached to the detection mat, and slowing the tempo of the accompaniment in a case where the amount of displacement exceeds a reference value.

As a result, attention can be called to the displacement of the mat.

A game device according to a fourth aspect of the present invention includes a detection mat that detects a pressure over a predetermined range and a controller detachably attached to the detection mat, the game device being configured to acquire, via the controller, an operation instruction made by a stepping motion of the player on the detection mat, and configured to include a presentation unit, an acquiring unit, a controller detection unit, a measuring unit and an evaluation unit.

First, the presentation unit sequentially presents content of the stepping motion requested to the player by, for example, displaying the content on the display unit. Further, the acquiring unit sequentially acquires, the result of the stepping motion of the player via the controller.

On the other hand, the controller detection unit detects a position of the controller attached to the detection mat at every predetermined timing. Further, the measuring unit measures an amount of displacement of the detection mat during the game, based on a relationship among the detected positions. The evaluation unit evaluates correctness of the stepping motion performed by the player, based on a relationship between the content of the presented stepping motion, and the acquired result of the stepping motion, and the measured amount of displacement.

That is, the amount of displacement of the detection mat is measured based on a relationship of the controller attached to the detection mat, and the stepping motion of the player is evaluated including the amount of displacement.

As a result of this, a stepping motion that does not cause the mat displacement can be highly evaluated.

A game device according to a fifth aspect of the present invention includes a detection mat that detects a pressure over a predetermined range and a controller detachably attached to the detection mat, the game device being configured to acquire, via the controller, an operation instruction made by a stepping motion of a player on the detection mat, and configured to include a presentation unit, an acquiring unit, a controller detection unit, a measuring unit and a presentation content control unit.

First, the presentation unit sequentially presents content of the stepping motion requested to the player. Further, the acquiring unit sequentially acquires the result of the stepping motion of the player, via the controller. The controller detection unit detects a position of the controller at every predetermined timing.

On the other hand, the measuring unit measures an amount of displacement of the detection mat during the game, based on a relationship among the detected positions. The presentation content control unit changes content of the stepping motion to be requested based on the measured amount of displacement, and displays the changed contents of the stepping motion. For example, in order to correct the displacement of the detection mat, the presentation content control unit does not present the stepping motion toward the direction of displacement on purpose, and instead, presents the content of the stepping motion toward the inverse direction with respect to the displacement. Further, the presentation content control unit does not present a stepping motion by which the weight shift of the player becomes comparatively large (for example, consequent motions on diagonal lines, etc.) on purpose, and presents the stepping motion by thinning it to keep a sufficient time between the stepping motions.

That is, the amount of displacement of the detection mat is measured based on a relationship of the controller attached to the detection mat, and the content of the stepping motion to be presented is changed in a case where the amount of displacement exceeds a reference value so that occurrence of the displacement of the detection mat is suppressed as much as possible.

As a result of this, while enlargement of the displacement is prevented, attention can be called to the mat displacement.

A method for alarming according to a sixth aspect of the present invention includes a detection mat that detects a pressure over a predetermined range and a controller detachably attached to the detection mat, the game device being configured to acquire, via the controller, an operation instruction made by a stepping motion of the player on the detection mat, and configured to include a controller detection step, a measuring step and an output control step.

First, the controller detection step detects a position of the controller attached to the detection mat at every predetermined timing.

Then, the measuring step measures the amount of displacement of the detection mat during the game, based on a relationship among the detected positions. The output control step outputs advisory information in a case where the measured amount of displacement exceeds a reference value: for example, the output control unit synthesizes an alarm message or the like to a game screen and displays it, or emits an alarm sound, etc.

That is, the amount of displacement of the detection mat can be measured based on a relationship of the controller attached to the detection mat, and the displacement of the detection mat can be informed to a player by outputting advisory information in a case where the amount of displacement exceeds a reference value.

As a result of this, attention can be called to the displacement of the mat.

An information recording medium according to a seventh aspect of the present invention stores a program causing a computer (including electronic equipments) to serve as the above game sound output device.

A program according to an eighth aspect of the present invention causes a computer (including electronic equipments) to serve as the above game device.

This program can be recorded on a computer-readable information recording medium including a compact disk, a flexible disk, a hard disk, a magneto-optical disk, a digital video disk, a magnetic tape and a semiconductor memory, etc.

The program can be distributed or sold via a computer communication network, independently of a computer on which the program is executed. Further, the information recording medium can be distributed or sold independently of the computer.

Effect of the Invention

According to the present invention, in a game wherein a player performs a stepping motion on a mat, attention can be called to the mat displacement. Furthermore, a stepping motion that does not cause mat displacement can be highly evaluated.

EXPLANATION OF REFERENCE NUMERALS

Figure 1:
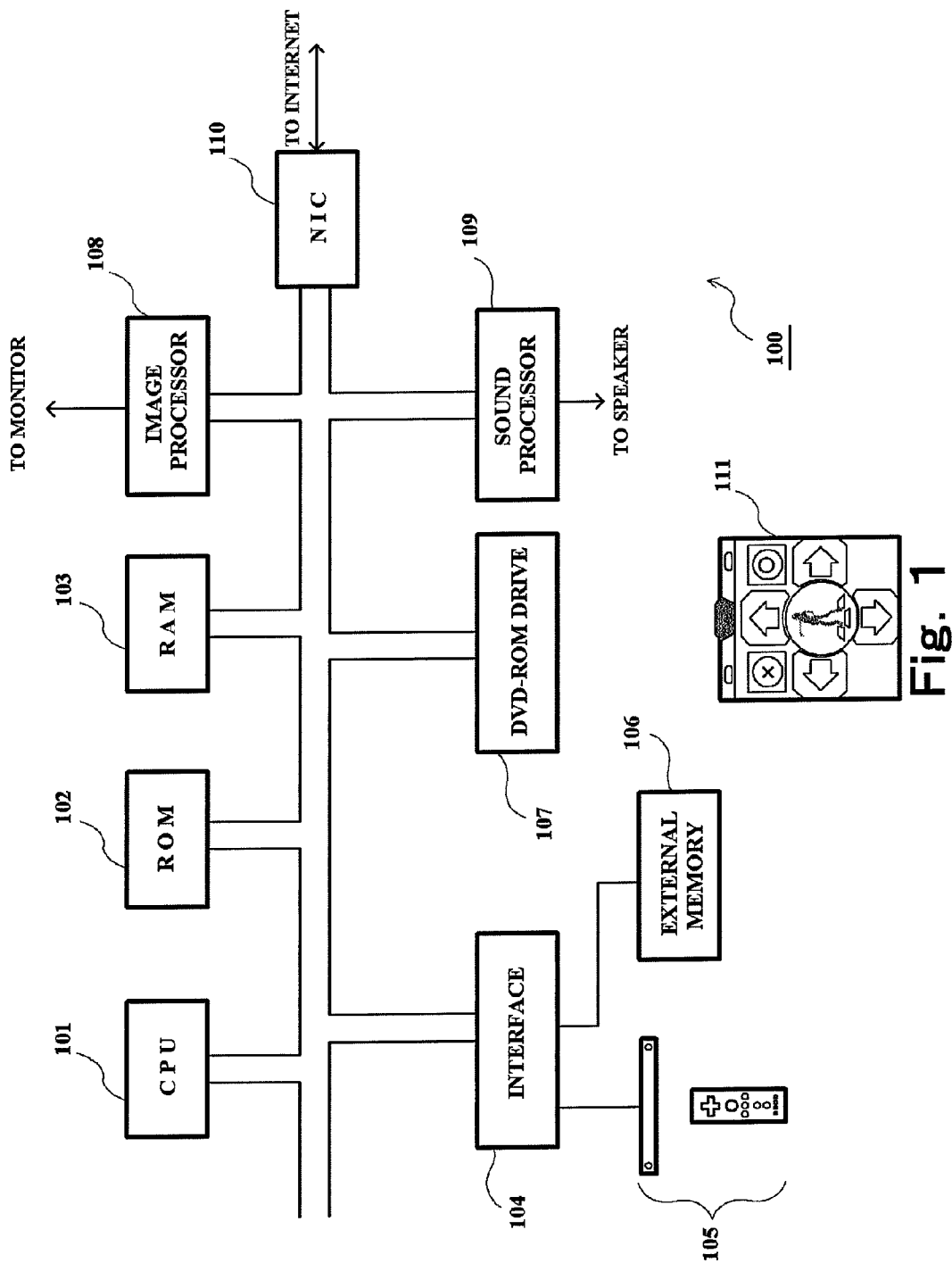
FIG. 1 is a schematic diagram showing the general configuration of an information processing device according to an embodiment of the present invention.

100 information processing device
101 CPU
102 ROM
103 RAM
104 interface
105 controller unit
106 external memory
107 DVD-ROM drive
108 image processor
109 sound processor
110 NIC
111 game mat
300 game device
301 wireless communication unit
302 motion content acquiring unit
303 controller detection unit
304 image information storage unit
305 request content creation unit
306 process control unit
307 image rendering unit
308 music information storage unit
309 music reproduction unit

BEST MODE FOR CARING OUT THE INVENTION

Embodiments of the present invention will be described in the following. For ease of understanding, the embodiments below of the present invention are described as applications to information processing device designed specially for games. However, the present invention may be similarly applied to information processing devices, such as various computers, a PDA (Personal Data Assistants), or a mobile phone. In other words, the embodiments described in the following are provided to give explanations, not to limit the scope of the present invention. Therefore, those skilled in the art can adopt embodiments in which some or all of the elements herein have been replaced with respective equivalents, and such embodiments are also to be included within the scope of the present invention.

(First Embodiment)

FIG. 1 is a schematic diagram showing a general configuration of a typical information processing device in which a game device according to an embodiment of the present invention is realized. The descriptions in the following will be given with reference to this diagram.

An information processing device 100 is provided with a CPU (Central Processing Unit) 101, ROM (Read Only Memory) 102, RAM (Random Access Memory) 103, an interface 104, a controller unit 105, an external memory 106, a DVD (Digital Versatile Disc)-ROM drive 107, an image processor 108, a sound processor 109, and an NIC (Network Interface Card) 110 and a game mat 111.

By inserting a DVD-ROM storing a program and data for a game into the DVD-ROM drive 107 and powering on the information processing device 100, the program is executed, and the game device of the present embodiment is realized.

The CPU 101 controls the overall operation of the information processing device 100, and is connected to individual components for exchanging control signals and data.

Recorded in the ROM 102 is an IPL (Initial Program Loader), which is executed immediately after power-on. By executing the IPL, the program recorded on the DVD-ROM is read into the RAM 103, and execution of the program by the CPU 101 is commenced. Furthermore, the ROM 102 also stores programs and various data for an operating system necessary for controlling the overall operation of the information processing device 100.

The RAM 103 is for temporarily storing data and/or programs, and retains the program and/or data read out from the DVD-ROM, as well as data needed for other operations, such as advancing the game or conducting chat communication.

The controller unit 105, connected via the interface 104, receives control input made when a user plays a game. Further, a controller 210 that will be described later can be attached to the game mat 111. Upon the attachment, the controller unit 105 accepts input made by a stepping motion (step motion) of the player on the game mat 111. The detail of the controller unit 105 will be described later.

The external memory 106, being detachably connected via the interface 104, stores in a rewritable manner information such as data indicating game progress or chat logs (records). By issuing command input via the controller unit 105, the user can appropriately record such data on the external memory 106.

Recorded on the DVD-ROM loaded into the DVD-ROM drive 107 is the program for realizing the game, as well as graphical and audio data associated with the game. Under the control of the CPU 101, the DVD-ROM drive 107 conducts processing to read out the necessary program and/or data from the DVD-ROM loaded therein. The information read out is then temporarily stored in the RAM 103 or similar memory.

The image processor 108 processes data read from the DVD-ROM by using the CPU 101 and/or an image operation processor (not shown) provided in the image processor 108, and then records the resulting data in frame memory (not shown) provided in the image processor 108. The image information recorded in the frame memory is then converted into a video signal at a predetermined synchronous timing, and output to a monitor (the display 290 described later) connected to the image processor 108. This makes it possible to display a variety of images.

The image operation processor is capable of executing transparency operations such as overlaying two-dimensional images and a blending, as well as various saturate calculations, at high speeds.

In addition, the image operation processor is also capable of executing high-speed computations whereby polygon information, being disposed in a virtual three-dimensional space and having various kinds of texture added thereto, is rendered by means of z-buffering, thereby acquiring a rendered image showing a view of the polygons disposed in the virtual three-dimensional space, viewed from a given point of view.

Furthermore, by means of the CPU 101 and the image operation processor operating in coordination, it is possible to draw a string of characters as a two-dimensional image in the frame memory or on respective polygon surfaces, in accordance with font information that defines the shapes of the characters. Although the font information is recorded in the ROM 102, dedicated font information recorded on the DVD-ROM may also be used.

The sound processor 109 converts audio data read out from the DVD-ROM into an analog audio signal, and then causes the audio signal to be output from a speaker connected thereto (a speaker of the display 290 that will be described later). In addition, under control of the CPU 101, the sound processor 109 also generates sound effects and music data that should be generated as the game progresses, and then causes a speaker to output sounds corresponding thereto.

The NIC 110 serves to connect the information processing device 100 to the Internet or a similar computer communications network (not shown). The NIC 110 may conform to the 10BASE-T/100BASE-T standard used when forming a LAN (Local Area Network), or alternatively, the NIC 110 may be made up of a modem, such as an analog modem for connecting to the Internet using a telephone circuit, an ISDN (Integrated Services Digital Network) modem, an ADSL (Asymmetric Digital Subscriber Line) modem, or a cable modem, etc. for connecting to the Internet using a cable television circuit, as well as an interface (not shown) that interfaces between the CPU 101 and any one of the above modems.

The game mat 111 is, for example, formed in a rectangular flat shape, and has a pressure sensor and switches, etc. disposed therein. When the game mat 111 is used, laid on a floor, and a predetermined area is pressed (pressed down) by foot by a player, the game mat 111 detects that the region is stepped.

Furthermore, a controller unit 105 (controller 210 described later) can be attached to the game mat 111. The details of the game mat 111 will be described later.

In addition, the information processing device 100 may also be configured to use a hard disk or similar large-capacity external storage device to perform functions equivalent to components such as the ROM 102, the RAM 103, the external memory 106, and the DVD-ROM loaded into the DVD-ROM drive 107.

Furthermore, it may also be possible to employ a mode wherein a keyboard for receiving input for editing character strings from a user, or a mouse for receiving input that specifies various types of positions and makes selections, are connected thereto.

Furthermore, it is also possible to use a common computer (such as a general-purpose personal computer) as the game device, instead of the information processing device 100 of the present embodiment. For example, a common computer is provided with a CPU, RAM, ROM, a DVD-ROM drive, and an NIC, similarly to the information processing device 100. Moreover, a common computer is also provided with an image processor having simplified functions compared to that of the information processing device 100, as well as a hard disk that serves as an external storage device. Besides the above, a common computer may also be configured to use storage media such as flexible disks, magneto-optical disks, and magnetic tapes. In addition, in a common computer, devices such as a keyboard and a mouse are used as input devices, rather than a controller. Furthermore, after installing a game program, a common computer functions as a game device when the program is executed.

(Overview of Controller Unit and Game Mat)

Figure 2:
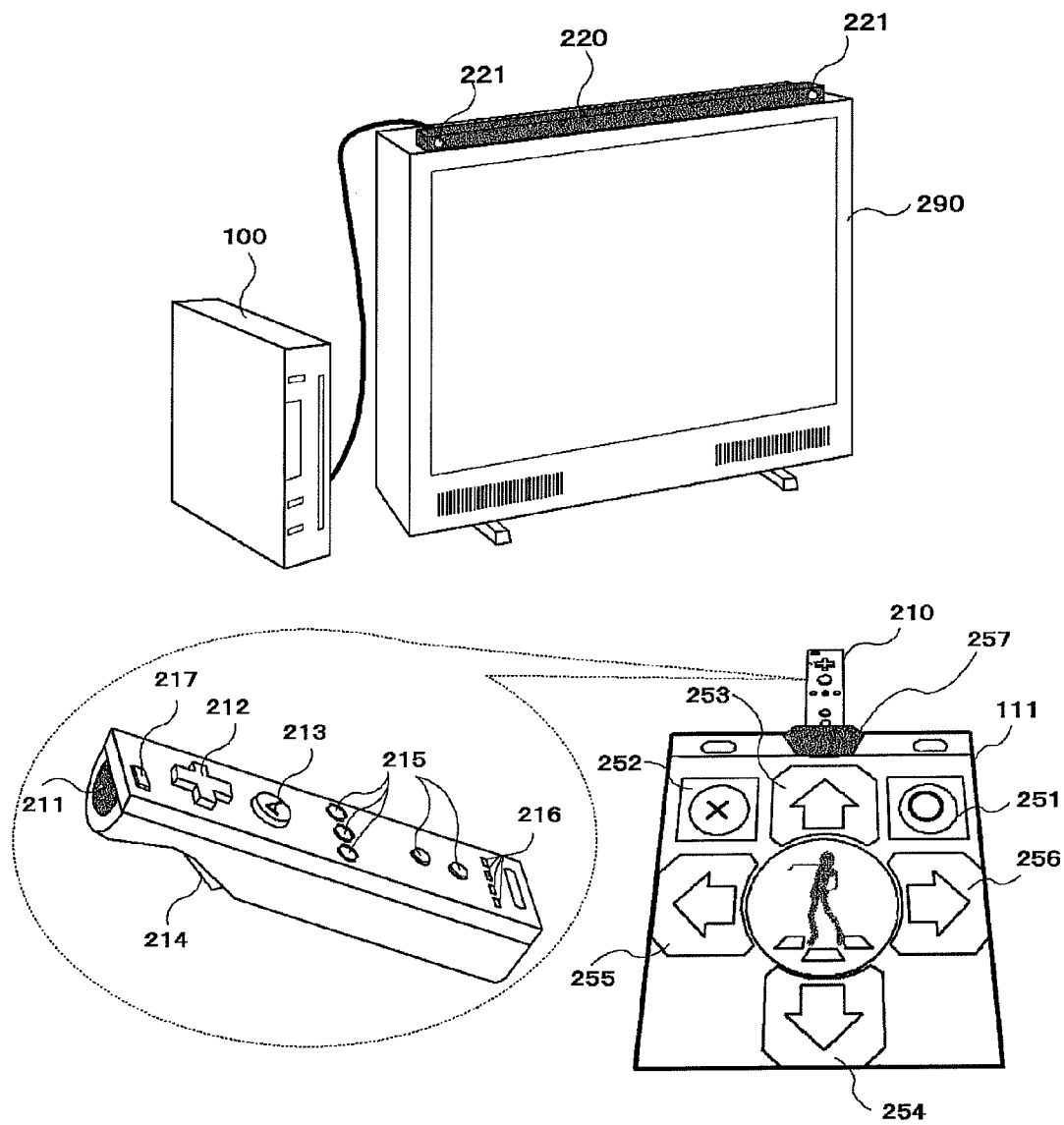
FIG. 2 is an external view for explaining outline of a controller unit and a game mat.

FIG. 2 is an external view for explaining the overview of the above-described controller unit 105 and the game mat 111.

The controller unit 105 is structured to include a controller 210 and a light emission module 220. The information processing device 100 is connected to the display 290 via a predetermined cable, and displays an image generated by the image processor 108 on a display screen of the display 290, and outputs sound effects or the like generated by the sound processor 109 from a speaker of the display 290.

The controller 210 has, for example, the exterior similar to a remote control for a television set, and connected wirelessly (by wireless communication) to the information processing device 100. The controller 210 can be held and operated by one hand of a player.

On the other hand, the light emission module 220 is formed into a rod shape of a predetermined length and has one light emitting diode 221 embedded at each of both ends thereof. Then, for example, the light emission module 220 is appropriately fixed on the top of the display 290 along the orientation of the screen. This light emission module 220 is connected to the information processing device 100 by a cable, and causes the light emitting diode 221 to appropriately emit light by being supplied with power.

The controller 210 has a CCD camera 211 disposed on its end. This CCD camera 211 captures an image including two light emitting diodes 221 (two light emitting points) of the light emission module 220 when the end of the controller 210 is aimed at the display 290. Further, the controller 210 comprises therein a wireless communication unit, and sequentially transmits information of captured image by wireless communication to the information processing device 100.

The controller 210 can be attached to the game mat 111.

The controller 210 comprises therein an acceleration sensor, an angular acceleration sensor and an inclination sensor, etc., and can measure a motion such as twisting. The result of the measurement is also transmitted to the information processing device 100.

On the upper face of the controller 210, a cross key 212 is provided and various input of direction instruction, etc. can be made when the controller 210 is held by the player by hand and operated. Further, an A button 213 and various buttons 215 are also provided on the upper face, and instruction inputs associated with the buttons can be made.

On the other hand, a B button 214 is provided on the lower face of the controller 210. The button can be naturally pressed when being held by hand by the player and operated by the player, in conjunction with a dent formed on the lower face of the controller 210.

An indicator 216 on the upper face of the controller 210 is appropriately lit so as to achieve recognition even when a plurality of controllers 210 are used.

A power button 217 prepared on the controller 210 instructs, for example, power on and power off of the information processing device 100.

Further, inside the controller 210, a vibration mechanism including a vibrator or the like is provided, and causes vibration in response to an instruction from the information processing device 100.

On the other hand, the game mat 111 serves as a detection mat that is, in use, laid on a floor in front of the display 290 (light emission module 220), and detects a region stepped by foot by a player.

More specifically, a ○ key region 251, designed after the model of a ○ button, a x key region 252 designed after the model of a x button, and direction key regions 253 to 256 shaped after the model of each of direction buttons are provided on the mat so that a player can step on a desired region.

Pressure sensors and switches, etc. are embedded so as to correspond to each region, so that which region the player stepped on can be detected.

Further, a connection terminal 257 for attaching the controller 210 to the game mat 111 is provided to the game mat 111. Then, in the use with the controller 210 attached to the connection terminal 257, the content of the stepping motion (step motion) of the player on the game mat 111 is transmitted to the information processing device 100 via the controller 210.

The following describes that the position, etc. of the game mat 111 is measured by a combination of the controller 210 and the light emission module 220, with a state in which the controller 210 is attached to the game mat 111 taken as a standard state. The measurement of the position, etc. of the game mat 111 is not limited to the method in which the light emitting point (light emitting diode 221) of the light emission module 220 is captured by the CCD camera 211, and other methods can be applied appropriately. For example, the position, etc. of the controller 210 (game mat 111) may be obtained from a time lag of wireless communication between two points via a predetermined sensor bar. Further, a supersonic wave or infrared light, etc. may be used to obtain the position of the controller 210.

(General Configuration of Game Device)

Figure 3:
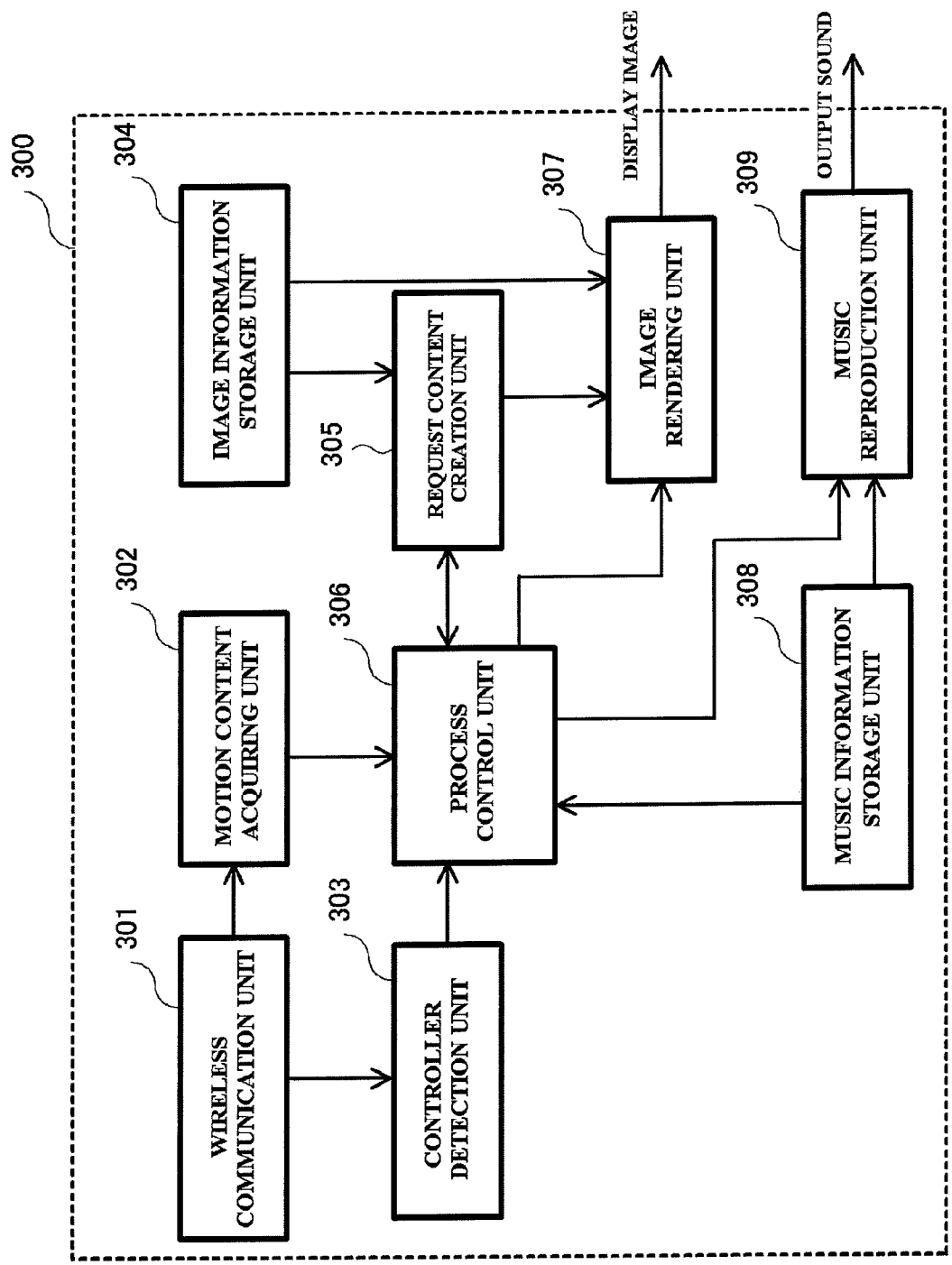
FIG. 3 is a schematic diagram showing the general configuration of a game device according to an embodiment of the present invention.

FIG. 3 is a schematic diagram showing a game device according to the present embodiment. This game device performs wireless communication with the controller 210 as described above and attached to the game mat 111 to acquire the content of the stepping motion of the player, as well as measuring displacement of the game mat 111, etc. based on the position of the controller 210 and the orientation of its end, etc.

More specifically, the device is a dance game device which has installed therein a dance game which, while reproducing a predetermined music, displays an instruction of a motion requested to the player (designation of a region on which to step, etc.) on the display 290, acquires the stepping motion of the player on the game mat 111 via the controller 210 and evaluates the stepping motion. Then, the device measures the amount of displacement, etc. of the game mat 111 and informs the player of it. The following provides an explanation with reference to this diagram.

A game device 300 includes: a wireless communication unit 301; a motion content acquiring unit 302; a controller detection unit 303; an image information storage unit 304; a request content creation unit 305; a process control unit 306; an image rendering unit 307; a music information storage unit 308; and a music reproduction unit 309.

First, the wireless communication unit 301 performs wireless communication sequentially with the controller 210 to transmit and receive information needed.

For example, the wireless communication unit 301 sequentially acquires the content of the operation transmitted from the controller 210 and supplies the acquired contents to the motion content acquiring unit 302. That is, the wireless communication unit 301 wirelessly acquires information as to the pressure over a predetermined range made by a player having stood on the game mat 111, via the controller 210 attached to the game mat 111.

Further, the wireless communication unit 301 sequentially receives information as to the position (position information and information as to the orientation of the frontal) that is transmitted from the controller 210, and supplies it to the controller detection unit 303.

The controller unit 105 may serve as such a wireless communication unit 301.

The motion content acquiring unit 302 acquires the content of the stepping motion of the player, based on the information supplied from the wireless communication unit 301. That is, the motion content acquiring unit 302 acquires in real time which region on the game mat 111 the player has stepped, etc.

Then, the motion content acquiring unit 302 supplies the acquired content of the stepping motion to the process control unit 306.

The CPU 101 may serve as such a motion content acquiring unit 302.

The controller detection unit 303 sequentially detects the position, etc. of the game mat 111, based on information as to the position supplied from the wireless communication unit 301. That is, the controller detection unit 303 detects the position, etc. of the game mat 111 by acquiring the position, etc. of the controller 210 attached to the game mat 111.

The CPU 101 may serve as such a controller detection unit 303.

The image information storage unit 304 stores decoration image for display in time with the music to be reproduced and various images for presenting the requested motions (for example, four arrows of four directions: up, down, left and right, etc.).

The DVD-ROM attached to the DVD-ROM drive 107 and the RAM103 may serve as such an image information storage unit 304.

The request content creation unit 305 is controlled by the process control unit 306, selects appropriately an image for displaying the requested motion from the image information storage unit 304 and controls the image rendering unit 307 to render the selected image. For example, the request content creation unit 305 in time with the reproduced music and in a good timing selects any of the arrow images of up, down, left and right and controls the image rendering unit 307 to render the image.

The CPU 101 may serve as such a request content creation unit 305.

The process control unit 306 controls the entire game device 300.

For example, the process control unit 306 controls the music reproduction unit 309 to output a music sound, while controlling the request content creation unit 305 to present the content of the motion requested to the player (controls the display 290 to display arrow image or the like).

At the same time, the process control unit 306 compares the content of motion acquired from the motion content acquisition unit 302 with the presented requested motion (and timing) to evaluate the stepping motion of the player.

Further, the process control unit 306 measures the amount of displacement of the game mat 111 in accordance with the position, etc. of the controller 210 detected by the controller detection unit 303.

Figure 4A:
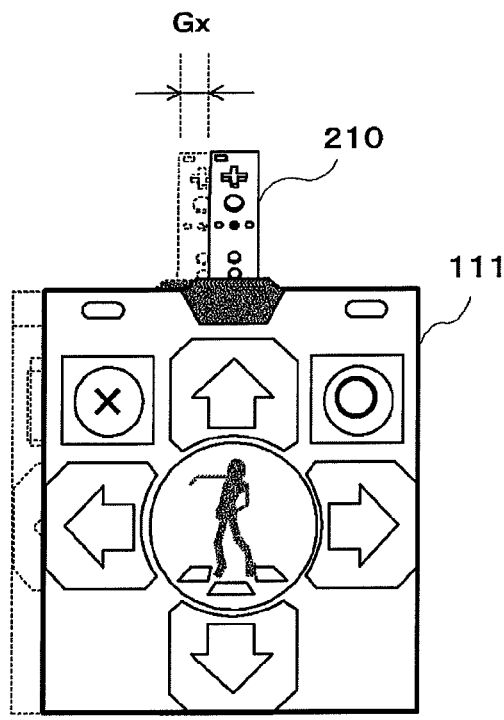
FIG. 4A is a schematic diagram for explaining the displacement of the game mat.
Figure 4B:
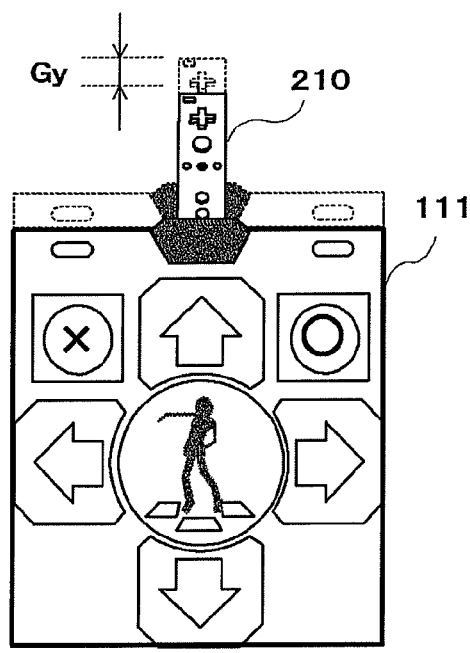
FIG. 4B is a schematic diagram for explaining the displacement of the game mat.

Specifically, the process control unit 306, as shown in FIG. 4A, measures the amount of displacement of the game mat 111 in the lateral direction based on the change of position (Gx) of the controller 210 in the lateral direction (x direction). Similarly, as shown in FIG. 4B, the process control unit 306 measures the amount of displacement in the lateral direction of the game mat 111 from the change of position (Gy) of the controller 210 in the vertical direction (y direction). Naturally, when the game mat 111 is displaced in both vertical and lateral directions at the same time, the amount of displacement in both directions are measured.

Figure 4C:
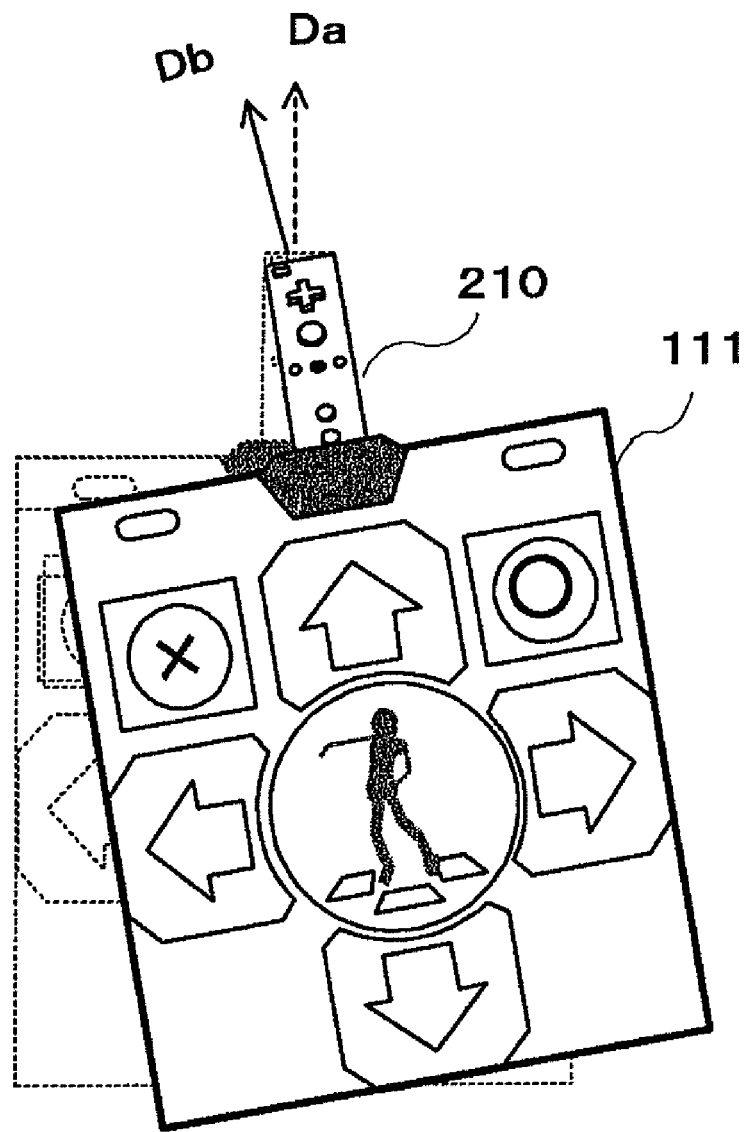
FIG. 4C is a schematic diagram for explaining the displacement of the game mat.

Further, even if the position of the controller 210 is the same, in some cases the orientation thereof may be different. That is, as shown in FIG. 4C, when the orientation of the frontal of the controller 210 is different between Da and Db, the game mat 111 is displaced in a rotational manner. In this case, the process control unit 306 measures the amount of displacement of the game mat 111 in the direction of rotation, based on a difference of the orientation of the frontal, etc.

Then, the process control unit 306, when the amount of displacement of the game mat 111 measured during the game exceeds a reference value, generates a predetermined alarm message or an alarm image to call the attention of the player and synthesizes them to the game screen and displays it.

The CPU 101 can serve as such a process control unit 306.

The image rendering unit 307 renders a predetermined decoration image, etc. in time with a music that is reproduced. Then, the image rendering unit 307 appropriately synthesizes an image for presenting the requested motion created by the request content creation unit 305, to generate a display image (game screen) and displays it on the display 290.

Figure 5A:
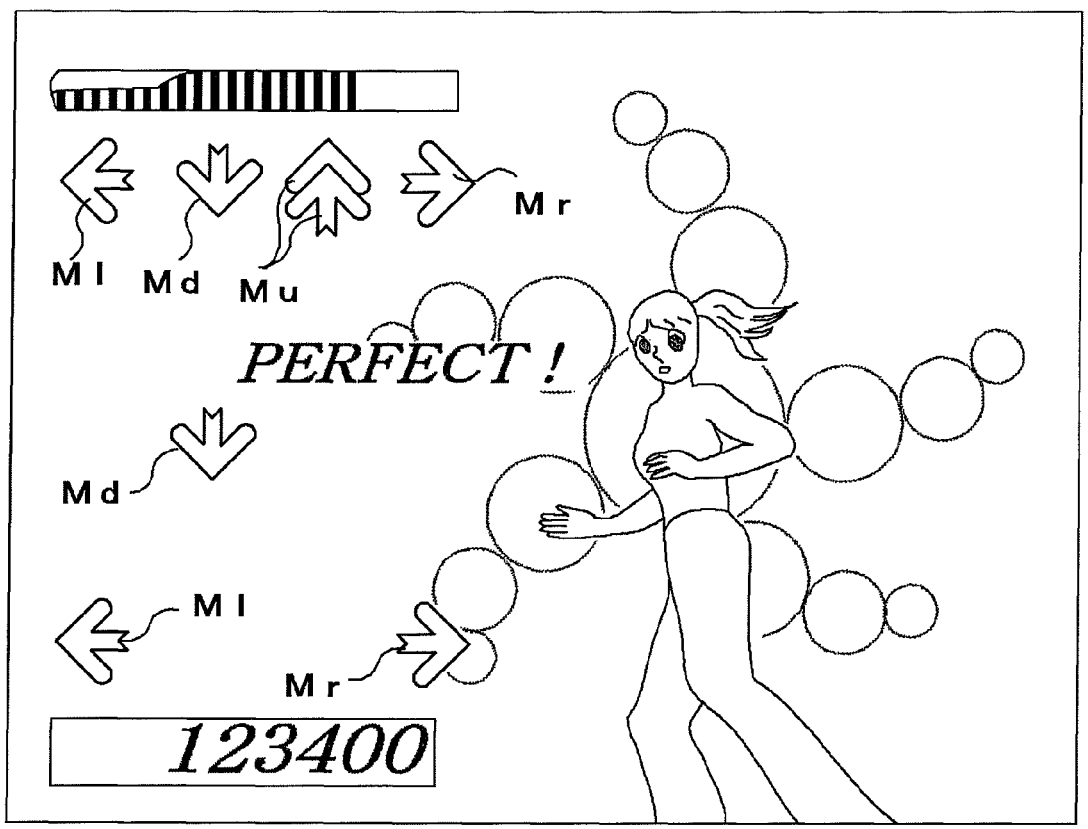
FIG. 5A is a schematic diagram showing one example of a display image (game screen).

For example, the image rendering unit 307 generates a display image including arrows of four directions Ml, Md, Mu and Mr as shown in FIG. 5A. In this figure, arrows Ml, Md, Mu and Mr present the stepping motion requested to the player. For example, in the case where the arrow Ml is presented, the player is requested to step in the region 255 (left arrow) of the game mat 111 at the timing. Similarly, when the arrows Md, Mu and Mr are presented, the player is requested to step on a region 254 (down arrow), a region 253 (upper arrow) and a region 256 (right arrow) of the game mat 111.

Figure 5B:
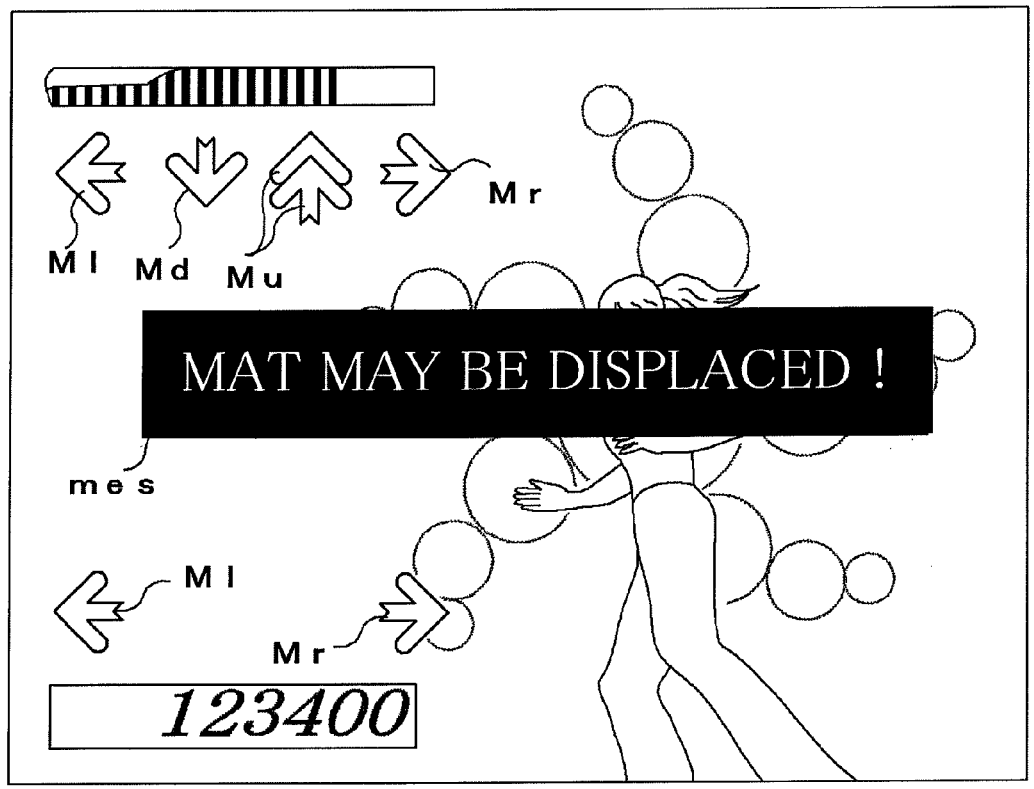
FIG. 5B is a schematic diagram showing one example of a display image (game screen).

Further, when the amount of displacement of the game mat 111 exceeds a reference value, the image rendering unit 307 generates a display image including an alarm message mes as shown in FIG. 5B. That is, on the halfway of the game, and on the interval of the game and the termination of the game, the displacement of the game mat 111 is informed to call the attention of the player.

The image processor 108 can serve as such an image rendering unit 307.

The music information storage unit 308 stores a plurality of pieces of music data that constitutes an accompaniment at the time of stepping of the player. That is, the player can select the preferred music and step to the music.

DVD-ROMs attached to the DVD-ROM drive 107 and the RAM103 can serve as such a music information storage unit 308.

The music reproduction unit 309 has a sound source such as a synthesizer, and sequentially synthesizes electronic sounds based on music data such as MIDI (Musical Instrument Digital Interface) data, and causes the speaker of the display 290 to output the music sound therefrom.

The sound processor 109 can serve as such a music reproduction unit 309.

(Overview of Operation of Game Device)

Figure 6:
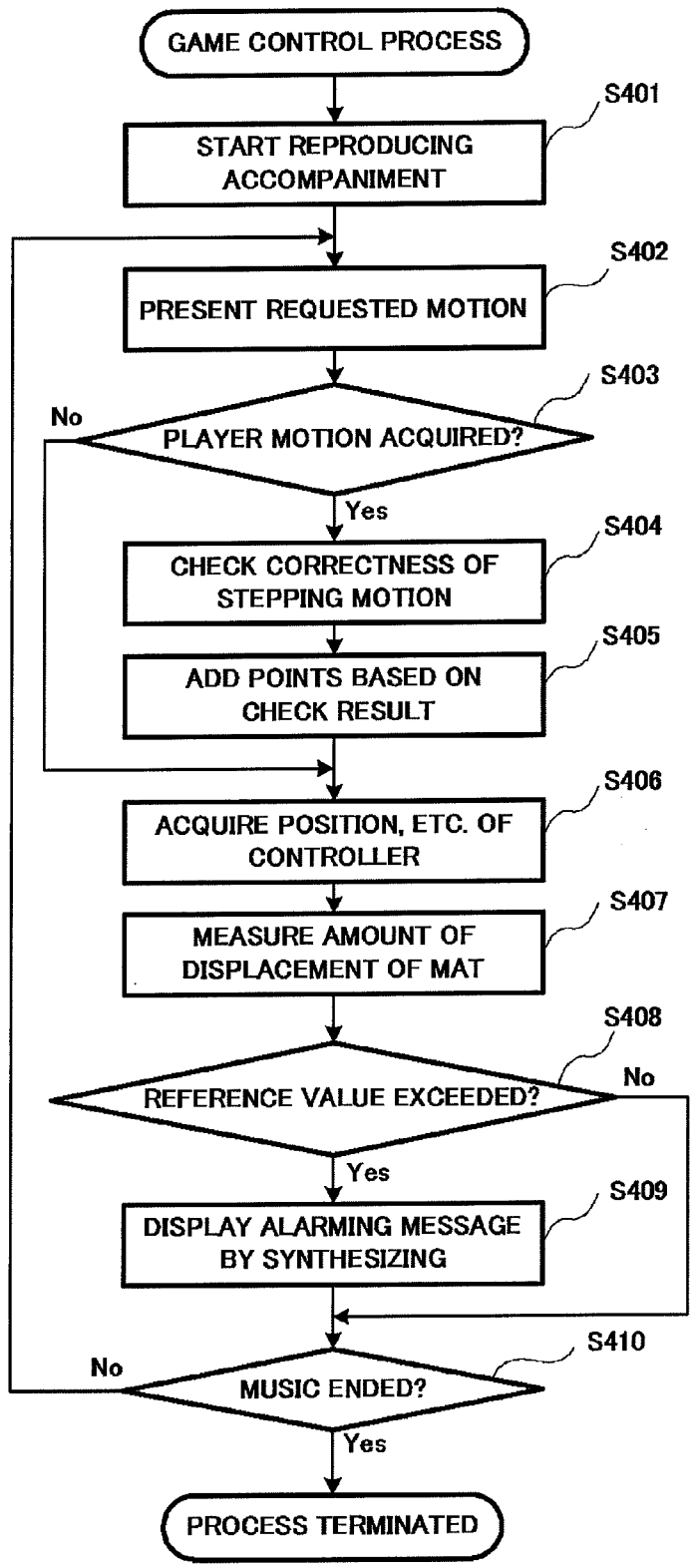
FIG. 6 is a flowchart showing one example of a game control process according to an embodiment of the present invention.

FIG. 6 is a flowchart showing the flow of the game control process executed on the game device 300 of the above-described structure. The following describes the operation of the game device 300 with reference to this flowchart. This game control process is suitable for a dance game that evaluates stepping motions (step motions) of a player while detecting the displacement of the game mat 111.

First, the game device 300 commences reproduction of an accompaniment sound (step S401). That is, the music reproduction unit 309 reproduces an accompaniment arbitrarily selected by the player (a music that will be an accompaniment for the stepping of the player), and outputs the accompaniment from the speaker of the display 290.

The game device 300 presents motions requested to the player (step S402). For example, the image rendering unit 307 generates a display image including the above-described four arrows Ml, Md, Mu and Mr in four directions as shown in FIG. 5A and displays the image on the display 290.

The game device 300 determines whether it has acquired the stepping motion of the player (step S403). That is, the process control unit 306 determines whether the motion content acquiring unit 302 has acquired the content of the stepping motion of the player, based on information supplied from the wireless communication unit 301.

When the game device 300 determines that the stepping motion of the player has not been acquired (step S403; No), the game device 300 proceeds the process to step S406 that will be describe later.

On the other hand, when the game device 300 determines that the stepping motion of the player has been acquired (step S403; Yes), the game device 300 checks correctness of the stepping motion (step S404).

That is, the process control unit 306 compares the contents of the motion acquired from the motion content acquiring unit 302 with the requested motion (and timing) presented in step S402 to evaluate the stepping motion of the player.

The game device 300 adds points in accordance with the check result (evaluation result) (step S405). That is, the game device 300 adds points displayed on the display 290 in a case where the player performs in good timing a stepping motion that is the same as what is requested and presented. Where it is a different stepping motion or a stepping motion, albeit the same, off the timing, the points are not added.

The game device 300 acquires the position, etc. of the controller 210 (step S406). That is, the controller detection unit 303 detects the position, etc. of the game mat 111 based on the information that is in regards to the position and that is supplied from the wireless communication unit 301.

The game device 300 measures the amount of displacement of the game mat 111 (step S407).

That is, the process control unit 306 measures the amount of displacement of the game mat 111 in the lateral and vertical directions based on the change of positions (Gx, Gy) in the lateral direction (x direction) and the vertical direction (y direction) of the controller 210, as shown in the above-described FIGS. 4A and 4B.

Further, the process control unit 306, as shown in the above-described FIG. 4C, measures the amount of displacement of the game mat 111 in the direction of rotation, based on the change of orientation (from Da to Db) of the frontal of the controller 210, etc.

The game device 300 determines whether the measured amount of displacement of the game mat 111 exceeds a reference value (step S408).

That is, the process control unit 306 determines whether the amount of displacement in the lateral direction and the vertical direction of the game mat 111 exceeds a reference value, and whether the amount of displacement in the direction of rotation exceeds a reference value. The reference values to be compared are appropriate values each obtained by an experiment, etc.

The game device 300, when determining that the amount of displacement of the game mat 111 does not exceed the reference value (step S408; No), proceeds the process to step S410 that will be described later.

On the other hand, when the game device 300 determines that the amount of displacement of the game mat 111 exceeds the reference value (step S408; Yes), the game device 300 displays an alarm message by synthesizing (step S409). For example, the image rendering unit 307 generates a display image including the alarm message mes as shown in the above-described FIG. 5B, and displays it on the display 290.

That is, the game device 300 informs that the game mat 111 is displaced to call attention of the player.

The game device 300 determines whether the reproduction of a music has been ended (step S410). That is, the game device 300 determines whether one game of the dance game has been terminated.

The game device 300, when determining that the reproduction of the music has not been ended (step S410; No), brings the process back to the above-described step S402. That is, the game device 300 repeats the processes of steps S402 to 410 until the music ends.

On the other hand, when determining that the reproduction of a music has been ended (step S410; Yes), the game device 300 displays a predetermined end message and the total score, etc., and then terminates the game control process.

By such a game control process, it is possible to wirelessly acquire a stepping motion (step motion) of a player on the game mat 111 by using a controller 210 that carries out wireless communication.

This eliminates conventional problem of stumbling with a connection code and allows free choice of disposition of the game mat 111.

Further, by the position, etc. of the controller 210 attached to the game mat 111, the amount of displacement of the game mat 111 can appropriately be measured. Then, when the measured amount of displacement exceeds a reference value, it is possible to inform the player of the displacement by displaying the alarm message, etc.

As a result of this, it is possible to call attention to the displacement of the mat.

(Other Embodiments)

The above-described embodiment has described the case in which the amount of displacement of the mat is sequentially measured, and an alarm message, etc. is displayed when the amount of displacement exceeds the reference value. However, it may be so configured that: the position, etc. of the game mat 111 is detected at the start of the game and at the termination of the game (or at the time of musical interlude); and in a case where the amount of displacement of the game mat 111 obtained from both positions exceeds a reference value, an alarm message, etc. is displayed at the termination of the game (or at the time of musical interlude).

The above-described embodiment has described the case where the amount of displacement in the horizontal direction (the direction parallel to the floor) is obtained, as shown in FIGS. 4A to 4C. However, the momentary amount of displacement in the vertical direction (the direction perpendicular to the floor) may be obtained to calculate the strength, etc. of the stepping of the player.

Figure 7A:
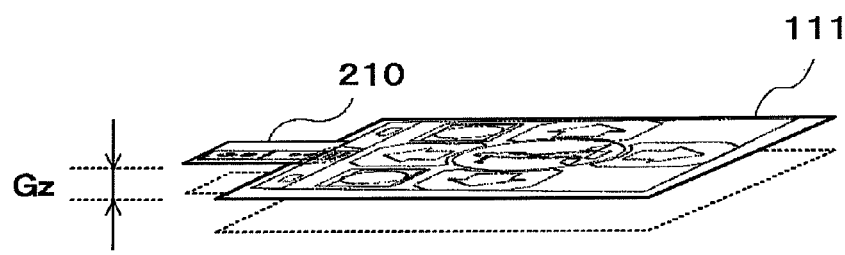
FIG. 7A is a schematic diagram for explaining displacement of a mat in the vertical direction.

More specifically, the process control unit 306, as shown in FIG. 7A, measures the momentary amount of displacement in the vertical direction (z direction) of the game mat 111, based on a momentary change (Gz) in the vertical direction (z direction) of the position of the controller 210.

Such displacement in the vertical direction is prominent where the weight of the player is heavy or the strength of the stepping of the player is high. Where the strength of the stepping, etc. becomes larger than is necessary, the concern is about a significant vibration or noise to be given to the downstairs.

Therefore, the process control unit 306, when the momentary amount of displacement in the vertical direction measured during the game exceeds a reference value, generates a predetermined alarm message or an alarm image for calling attention of a player, by synthesizing it to the game screen and displays the synthesized screen.

Figure 7B:
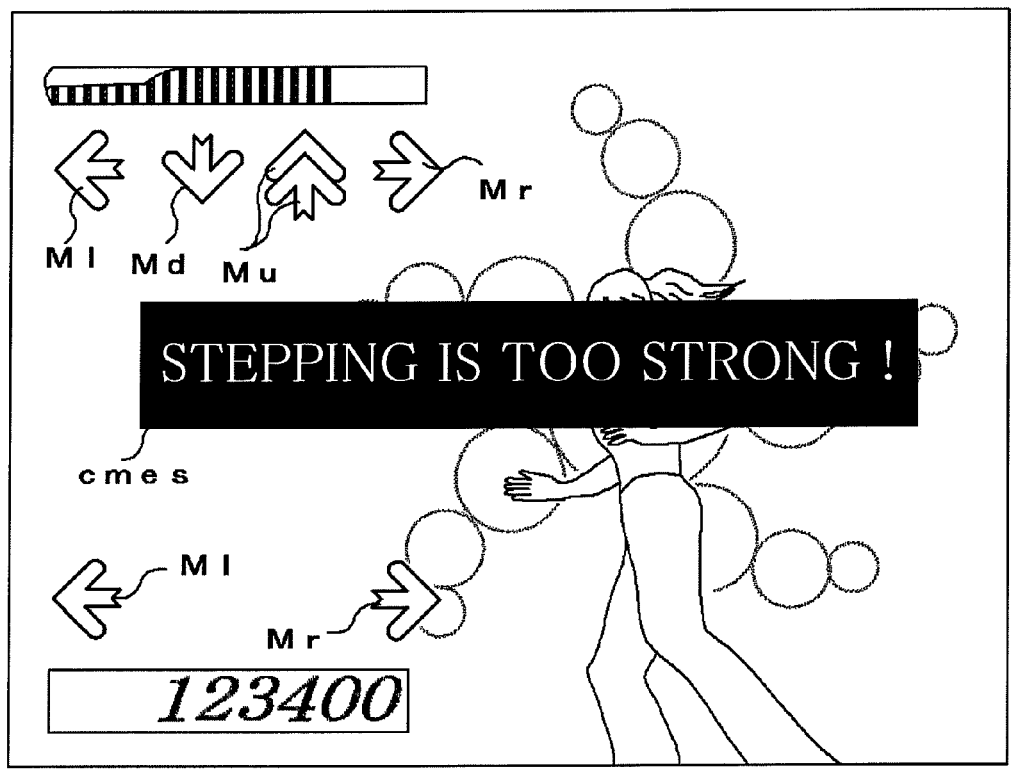
FIG. 7B is a schematic diagram showing one example of a display image including an alarm message.

For example, the process control unit 306 generates a display image including an alarm message cmes as shown in FIG. 7B. That is, it is informed in the halfway of the game, etc. that the stepping is too strong and attention is also called for the player.

This makes the player adjust the strength of the stepping and makes it possible to suppress occurrence of vibration or noise.

The above embodiment has described the case where, if the amount of displacement exceeds the reference value, it is informed by an alarm message, etc. However, where the amount of displacement is abnormally large, the progress of the game may be temporarily stopped and the stepping motion of the player may be suspended.

Then, the progress of the game may be resumed after elapse of a predetermined time or in response to a specific operation from the player.

In this case, attention can be called to the mat displacement even in a case where the player is too enthusiastic to be aware of the alarm message, etc.

Further, it may be so configured that the tempo in reproduction of a music (the speed of reproduction) is changed according to the magnitude of the amount of displacement.

For example, the magnitude of amount of displacement is classified into levels (steps), and it is determined which level the measured amount of displacement of the game mat 111 corresponds to. Then, in accordance with the determined level, the reproduction tempo of the music is changed.

More specifically, the reproduction tempo is slowed by about ten percent from the reference tempo in the case where the level is a low level. If the level is a modest level, the reproduction tempo is slowed by twenty to thirty percent, and if the level is the maximum level, the reproduction tempo is slowed by forty to fifty percent.

In this case, it is possible to call attention to the mat displacement by the change of tempo of reproduction.

Further, because the slower the reproduction tempo becomes, the larger the time allowance for stepping motion is; it naturally makes the stepping motion slow and makes the amount of displacement of the game mat 111 small.

The above embodiment has described a case where attention is called to the mat displacement by an alarm message or suspension of the game where the amount of displacement exceeds the reference value. However, it may be so configured that the content of the stepping motion is changed to such one that corrects (eliminates) the displacement and the changed content of the stepping motion is displayed to call attention to the mat displacement while preventing the enlargement of the displacement.

Specifically, the process control unit 306, when the measured amount of displacement exceeds the reference value, controls the request content creation unit 305 and makes changes to the content of the stepping motion.

For example, in order to correct the displacement of the game mat 111, the request content creation unit 305 does not present the stepping motion toward the direction of displacement on purpose, and instead, presents the content of the stepping motion toward the inverse direction with respect to the displacement.

Further, the request content creation unit 305 does not present a stepping motion by which the weight shift of the player becomes comparatively large (for example, consecutive motions on diagonal lines, etc.) on purpose, and presents the stepping motion by thinning it to keep a sufficient time between the stepping motions (so that the weight shift is slow).

That is, the content of the stepping motion to be presented is changed to suppress the displacement of the game mat 111 as much as possible, by changing the content of stepping motion to be presented.

This makes it possible to call attention to the mat displacement while suppressing the enlargement of the displacement.

The above embodiment has described a case where attention is called to the mat displacement by an alarm message and a game interruption, etc. in the case where the amount of displacement exceeds the reference value. However, a stepping motion that does not cause mat displacement may be more highly evaluated.

For example, the process control unit 306 further uses the amount of displacement of the game mat 111 as a negative weight on checking the correctness of the stepping motion of the player, such that the smaller the amount of displacement is, the higher the evaluation (the higher the score) to be obtained is. That is, albeit the stepping motion of the player is correct (in a good timing) the score to be added is small if the amount of displacement of the game mat 111 is large. Conversely, if the stepping motion of the player is correct and the amount of displacement of the game mat 111 is small, then the score to be added is high.

As a result of this, a stepping motion that does not cause mat displacement can be highly evaluated. Then, by highly evaluating the stepping motion that does not cause the mat displacement, it becomes possible to prevent the strength of the stepping of the player from being larger than is necessary.

The above embodiment has described a case where attention of the player is called by display of an alarm message or the like. However, information to call attention (advisory information) is not limited to such an alarm message or the like and arbitrarily determined. For example, an alarm sound or an alarm voice may be output to call attention of the player.

In addition, attention of the player can be called by changing the mode of display of the display screen (game screen), instead of directly displaying an alarm message, etc.

For example, it is possible that, when the mat displacement is caused, the game screen may be vibrated (the vibration may correspond to the direction of displacement), the color, pattern or brightness, etc. of the screen may be changed to call attention of the player.

The above embodiment has described, as one example, a dance game application. However, application is also possible to various games using the game mat 111 suitably, not limited to the dance game.

The present invention claims the priority based on the Japanese Patent Application No. 2006-228691 and the contents of this basic application is incorporated herein by reference.

Industrial Applicability

As described above, according to the present invention, it is possible to provide a game device, a method for alarming, an information recording medium and a program that are suitable for calling attention to a player as to the displacement of a mat, in a game wherein the player performs a stepping motion on the mat.

The invintion claimed is:

1. A game device, comprising:
a detection mat, located on a surface, that detects a pressure onto the detection mat and a position of the pressure in the detection mat;
a controller that is detachably attached to the detection mat;
an acquiring unit that acquires, via the controller, an operation instruction made by a stepping motion of a player on the detection mat, based on the detected pressure and the detected position of the pressure;
a controller detection unit that detects a position of the controller;
a measuring unit that measures an amount of displacement of the detection mat relative to the surface in a predetermined direction, based on the detected position of the controller, the predetermined direction being parallel to the surface, wherein the measuring unit, in measuring an amount of displacement of the detection mat, acquires a first position of the controller from the controller detection unit, acquires an indication of the stepping motion of the player on the detection mat, and acquires a second position of the controller from the controller detection unit, the amount of displacement of the detection mat relative to the surface in the predetermined direction being a function of the first and second positions of the controller; and an output control unit that outputs advisory information in a case where the measured amount of displacement in the predetermined direction exceeds a reference displacement value.

2. The game device according to claim 1, wherein the measuring unit measures the amount of displacement of the detection mat and the direction of displacement of the detection mat, based on a position of the controller detected by the controller detection unit at a start of a game and a position of the controller detected by the controller detection unit at a termination of the game.

3. The game device according to claim 1, wherein;
the measuring unit further measures a strength of stepping of the player, based on a change of a vertical position of the controller; and
the advisory information further informs the strength of stepping of the player in a case where the measured strength of stepping of the player exceeds a reference strength value.

4. The game device according to claim 1, further comprising:
a game control unit that suspends progress of the game in a case where the measured amount of displacement in the predetermined direction exceeds the reference displacement value.

5. The game device according to claim 4, wherein:
the advisory information further informs that the progress of the game is suspended in a case where the game control unit suspends the progress of the game; and
the game control unit resumes the progress of the game after elapse of a predetermined time from the suspension of the progress of the game.

6. The game device according to claim 1, further comprising:
a reproduction unit that reproduces an accompaniment for the stepping motion performed by the player; and
a reproduction control unit that sets a tempo of the accompaniment slower than standard, in a case where the measured amount of displacement in the predetermined direction exceeds the reference displacement value.

7. A notification method performed by a game device including a detection mat, located on a surface, that detects a pressure and onto the detection mat and a position of the pressure in the detection mat and a controller that is detachably attached to the detection mat, comprising:
an acquiring step of acquiring, via the controller, an operation instruction made by a stepping motion of a player on the detection mat, based on the detected pressure and the detected position of the pressure;
a controller detection step of detecting a position of the controller;
a measuring step of measuring an amount of displacement of the detection mat relative to the surface in a predetermined direction, based on the detected position of the controller, the predetermined direction being parallel to the surface, the measuring step including the steps of acquiring a first position of the controller from the controller detection unit, acquiring an indication of the stepping motion of the player on the detection mat, and acquiring a second position of the controller from the controller detection unit, the amount of displacement of the detection mat relative to the surface in the predetermined direction being a function of the first and second positions of the controller; and an output control step of outputting advisory information in a case where the measured amount of displacement in the predetermined direction exceeds a reference displacement value.

8. A non-transitory information recording medium storing a program that causes a computer including a detection mat, located on a surface, that detects a pressure onto the detection mat and a position of the pressure in the detection mat and a controller that is detachably attached to the detection mat, to function as:
an acquiring unit that acquires, via the controller, an operation instruction made by a stepping motion of a player on the detection mat, based on the detected pressure and the detected position of the pressure;
a controller detection unit that detects a position of the controller;
a measuring unit that measures an amount of displacement of the detection mat relative to the surface in a predetermined direction, based on the detected position of the controller, the predetermined direction being parallel to the surface, wherein the measuring unit, in measuring an amount of displacement of the detection mat, acquires a first position of the controller from the controller detection unit, acquires an indication of the stepping motion of the player on the detection mat, and acquires a second position of the controller from the controller detection unit, the amount of displacement of the detection mat relative to the surface in the predetermined direction being a function of the first and second positions of the controller; and
an output control unit that outputs advisory information in a case where the measured amount of displacement in the predetermined direction exceeds a reference displacement value.

9. A program stored in a non-transitory information recording medium, that causes a computer including a detection mat, located on a surface, that detects a pressure onto the detection mat and a position of the pressure in the detection mat and a controller that is detachably attached to the detection mat to function as:
an acquiring unit that acquires, via the controller, an operation instruction made by a stepping motion of a player on the detection mat, based on the detected pressure and the detected position of the pressure;
a controller detection unit that detects a position of the controller;
a measuring unit that measures an amount of displacement of the detection mat relative to the surface in a predetermined direction, based on the detected position of the controller, the predetermined direction being parallel to the surface, wherein the measuring unit, in measuring an amount of displacement of the detection mat, acquires a first position of the controller from the controller detection unit, acquires an indication of the stepping motion of the player on the detection mat, and acquires a second position of the controller from the controller detection unit, the amount of displacement of the detection mat relative to the surface in the predetermined direction being a function of the first and second positions of the controller; and
an output control unit that outputs advisory information in a case where the measured amount of displacement in the predetermined direction exceeds a reference displacement value.

* * * * *